J. E. JAMBOR.
TRAY FOR LAMP STEMS OR THE LIKE.
APPLICATION FILED JUNE 24, 1918.
Reissued June 8, 1920. 14,877.
*Fig. 1*
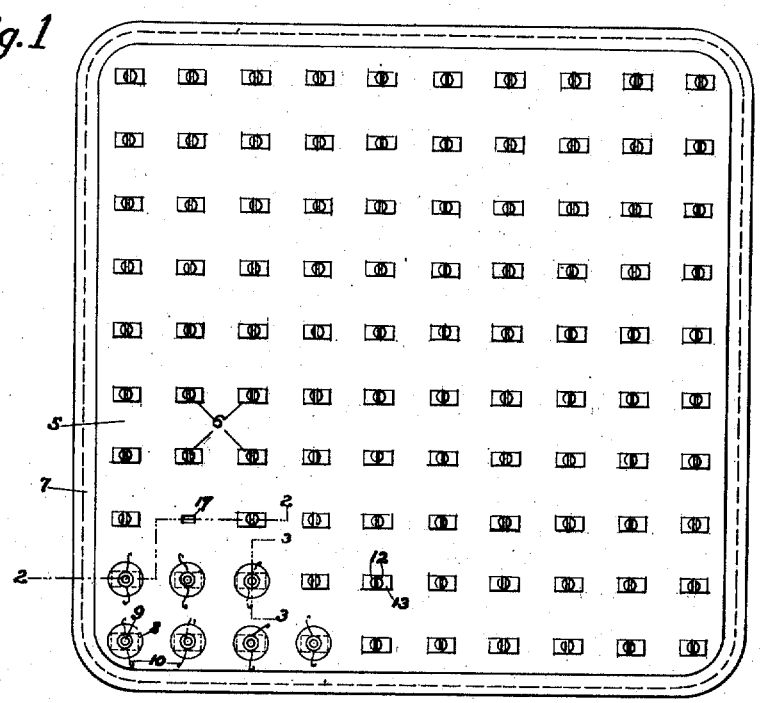
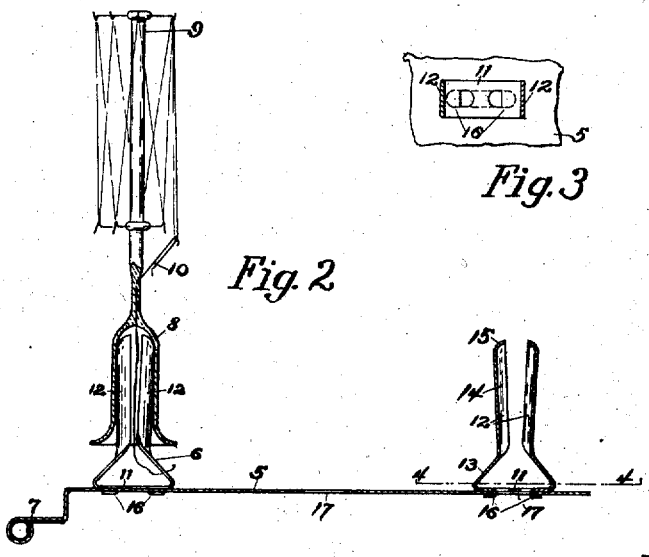
*Fig. 2*
*Fig. 3*
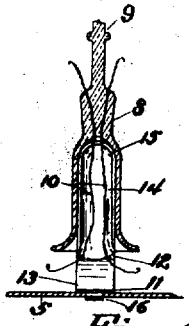
*Fig. 4*
INVENTOR
JOHN E. JAMBOR.
BY J. F. Eubert
ATTORNEY

UNITED STATES PATENT OFFICE.

JOHN E. JAMBOR, OF MILWAUKEE, WISCONSIN, ASSIGNOR TO WESTINGHOUSE LAMP COMPANY, A CORPORATION OF PENNSYLVANIA.

TRAY FOR LAMP-STEMS OR THE LIKE.

14,877. Specification of Reissued Letters Patent. Reissued June 8, 1920.

Original No. 1,261,937, dated April 9, 1918, Serial No. 131,471, filed November 15, 1916. Application for reissue filed June 24, 1918. Serial No. 241,708.

*To all whom it may concern:*

Be it known that I, JOHN E. JAMBOR, a citizen of the United States, and a resident of Milwaukee. in the county of Milwaukee and State of Wisconsin, have invented a new and useful Improvement in Trays for Lamp-Stems or the like, of which the following is a specification.

The invention relates to trays for use in the manufacture of incandescent or electric lamps.

In the present construction of electric lamps during the process of securing the parts of the stem carrying the filaments and conductors together and for carrying the stems from one place to another during the process of manufacture it has been customary to provide a tray having a wooden base with wooden pegs for receiving the lower hollow end of the stem. These pegs are objectionable however because they shrink and expand, and the stems vary in diameter, thus either loosely fitting the stems so that they fall and break through jarring in their movement from one place to another or breaking the stems due to the attempt to place them on the pegs when said pegs are in an enlarged and expanded condition or the stems are too small. The shrinkage of the pegs, accompanied by the shrinking of the wooden base adjacent the periphery thereof causes the pegs to become loosened, and a lamp stem placed upon one of these loosened pegs quite frequently has its filament or supports therefor entangled with that of an adjacent stem, which usually results in damage to both stems. To obviate these difficulties I have provided a special form of tray and a simple and efficient means for holding the stem in position on the tray to prevent loosening, falling and breaking of the stems caused by jarring when they are moved from one place to another and to eliminate cracking of the stems due to the small resistance offered in forcing them over these holders.

The invention further consists in the several features hereinafter set forth and more particularly defined by claims at the conclusion hereof.

In the drawings:

Figure 1 is a plan view of the device embodying the invention, parts being removed;

Fig. 2 is a section taken on the line 2—2 of Fig. 1;

Fig. 3 is a section taken on the line 3—3 of Fig. 1;

Fig. 4 is a section taken on the line 4—4 of Fig. 2.

In general the device comprises a support 5, and a plurality of stem holders 6 secured thereto.

The support 5 consists of a tray preferably of sheet metal having a marginal flanged edge 7 provided with a reinforcing member or rib and formed into a hollow cylinder, which construction affords additional rigidity and elevates the main body of the tray above the supporting surface.

The lamp stems as usually constructed consist of a hollow conical base portion 8 of glass and an upright portion 9 of glass, these portions being annealed together to form the complete stem, the conductor wires 10 being secured in said stem.

The stem holders 6 each consists of a yielding strip of metal having a flat intermediate portion 11 and upwardly extending portions 12. These upright portions have flat inwardly extending lower ends 13 and semi-cylindrical stem engaging portions 14 with curved upper ends 15. The holders being a resilient metal the upwardly extending portions 12 may be moved toward each other to form in effect a yielding peg, the stem engaging portions constantly bearing outwardly upon the base 8 of the stem inserted over them so that said stem cannot loosen from the peg while the tray is being carried from place to place and so that the stem will not be cracked when inserted over the ends of the peg. These pegs are each secured to the tray 5 by tongues 16 struck up from the flat portion 11 and bent over to engage the tray adjacent apertures 17 therein.

The glass stems are inserted over the yielding pegs as shown and thus held in place while undergoing the different lamp making operations.

The invention thus exemplifies a simple and efficient means for receiving and holding the stems carrying the lamp filaments and conductors.

What is claimed is:

1. As an article of manufacture a stem holder comprising a resilient metal plate having a base portion intermediate its ends and coöperative yielding arms extending upwardly from the base, said arms having semi-cylindrical outer surfaces so that when moved together they form a cylindrical peg and said ends being semi-conical so that when moved together they form a conical upper end for the peg.

2. A stem holder for filament stems comprising a support, a pair of resilient upright stem engaging members secured thereto, each member having a semi-cylindrical outer surface for engaging the wall of the filament stem substantially throughout its length and so that when moved together said members form a split cylindrical peg upon which said stem is disposed and held without liability to breakage.

3. A tray for lamp stems or the like comprising a sheet metal base having secured thereto holders, each of said holders consisting of a resilient strip of metal having a flat intermediate portion and upwardly extending members yieldable toward each other and curved outwardly, tongues projecting from the flat portion of said holders and bent to engage the metal base adjacent apertures therein.

4. A tray for lamp stems or the like comprising a sheet metal base having secured thereto holders, each of said holders consisting of a resilient strip of metal having a flat intermediate portion and upwardly extending members yieldable toward each other and curved outwardly, oppositely disposed tongues struck up from the flat portion of said holders and bent to engage the metal base adjacent apertures therein.

5. The combination, with a tray comprised of a sheet metal base having a marginal downwardly flanged edge, of a plurality of stem holders secured thereto, said holders being indifferent to atmospheric conditions and adapted to accommodate a plurality of sizes of lamp stems.

6. In combination, a tray comprised of a sheet metal base having a reinforced marginal depending flanged edge, and provided with means for attaching a plurality of work-holding members formed of sheet metal.

In testimony whereof, I have hereunto subscribed my name this 15th day of June, 1918.

JOHN E. JAMBOR.